United States Patent [19]

Ichikawa et al.

[11] Patent Number: 5,234,675
[45] Date of Patent: Aug. 10, 1993

[54] MANUFACTURING SINTERED BODY OF SILICON CARBIDE BY USING SIC WHISKERS IN A MULTIPLE HEATING STEP PROCESS

[75] Inventors: Hiroshi Ichikawa, Yokohama; Yoshikazu Imai, Tokyo, both of Japan

[73] Assignee: Nippon Carbon Co. Ltd., Tokyo, Japan

[21] Appl. No.: 769,506

[22] Filed: Oct. 1, 1991

Related U.S. Application Data

[63] Continuation of Ser. No. 545,725, Jun. 29, 1990, abandoned.

[30] Foreign Application Priority Data

Jun. 30, 1989 [JP] Japan .................. 1-166930

[51] Int. Cl.$^5$ .................. C04B 35/56; C01B 31/36
[52] U.S. Cl. .................. 423/345; 501/88; 501/95; 264/65; 264/66
[58] Field of Search .................. 423/344, 345; 501/88, 501/95; 264/65, 66

[56] References Cited

U.S. PATENT DOCUMENTS

| | | | |
|---|---|---|---|
| 4,100,233 | 7/1978 | Yajima et al. | 423/345 |
| 4,122,139 | 10/1978 | Yajima et al. | 501/88 |
| 4,158,687 | 6/1979 | Yajima et al. | 264/60 |
| 4,564,601 | 1/1986 | Kriegesmann et al. | 501/88 |
| 4,618,591 | 10/1986 | Okamura et al. | 501/95 |
| 4,743,411 | 5/1988 | Shimada et al. | 264/22 |
| 4,818,732 | 4/1989 | Fox et al. | 501/81 |

FOREIGN PATENT DOCUMENTS 2329611 10/1976 European Pat. Off. .
0030105 11/1980 European Pat. Off. .

Primary Examiner—Olik Chaudhuri
Assistant Examiner—Ken Horton
Attorney, Agent, or Firm—Armstrong, Westerman, Hattori, McLeland & Naughton

[57] ABSTRACT

An organosilicon high molecular compound having a skeleton of silicon and carbon or a compound obtained by polymerization of an organometallic compound and the organosilicon high molecular compound is melted into a fiber, then the fiber is antimelt-treated in an oxidizing atmosphere, and the antimelt-treated yarns are thereafter heated in an atmosphere of inert gas to obtain a fiber of silicon carbide containing 2 to 20% by volume of oxygen. This fiber is further sintered in an atmosphere of inert gas at a temperature of 1400 to 2100 deg. C. and a pressure of 300 to 3000 kg/cm$^2$. A sintered body of silicon carbide having an excellent bending strength is obtained without the use of a sintering agent or a binder. A fiber of silicon carbide having a predetermined oxygen content and a thin amorphous carbon layer thereon is obtained from the starting fiber by antimelt-treating and then heating in an atmosphere of a mixture of an inert gas and a hydrocarbon gas. Silicon carbide powder is mixed with the fiber thus obtained and the mixture is then heated in an atmosphere of inert gas under pressure. The sintered body thus obtained has a high strength and a remarkably small decrease in strength at high temperature.

2 Claims, No Drawings

MANUFACTURING SINTERED BODY OF SILICON CARBIDE BY USING SIC WHISKERS IN A MULTIPLE HEATING STEP PROCESS

This application is a continuation of application Ser. No. 545,725 filed Jun. 29, 1990, now abandoned.

BACKGROUND OF THE INVENTION

1. Field of the Invention

This invention relates to a method of manufacturing a sintered body of silicon carbide which has a superior bending strength.

2. Description of the Prior Art

As a method of manufacturing a sintered body of silicon carbide, there have been known heretofore, for example, a method of adding to silicon carbide powders a sintering agent such as boron, carbon, boron carbide or aluminum nitride and then heat-treating the mixture at a temperature of 1800 to 2200 deg. C. in an atmosphere of an inert gas, and a method of adding to silicon carbide powders or silicon carbide fibers a binder such as polycarbosilane, polysilane or polysilazane and then heat-treating the mixture at a temperature of 1200 to 1500 deg. C. in an atmosphere of an inert gas.

However, in the former method, i.e., in the case of using a sintering agent, it is rather difficult to uniformly disperse the sintering agent into the antimelt-treated substance. Further, there is a problem in that it is difficult to obtain a sintered body of silicon carbide which is superior in heat resistivity.

On the other hand, in the latter method, i.e., in the case of adding a binder to the silicon carbide powders or silicon carbide fibers, the binder is decomposed during the heat treatment, and consequently the ratio of conversion into silicon carbide decreases; it is difficult to obtain silicon carbide of high density, resulting in a lowered bonding force among the powders or fibers. As a result, there is a problem in that the bending strength of the sintered body of the silicon carbide thus obtained decreases.

It is an object of this invention to solve the problems of the prior art methods and to provide a method of manufacturing a sintered body of silicon carbide which has a superior bending strength.

SUMMARY OF THE INVENTION

According to the present invention there is provided a method of manufacturing a sintered body of silicon carbide which is characterized by the steps of: melting into a fiber (having an individual filament diameter of 15-25 μm) an organosilicon high molecular compound having a main skeleton of silicon and carbon or a compound obtained by polymerization of an organometallic compound and the organosilicon high molecular compound; antimelt-treating the fiber in an atmosphere of an oxidizing gas and thereafter heating the antimelt-treated fiber in an atmosphere of an inert gas to obtain a fiber of silicon carbide containing 2 to 20% by weight of oxygen; and sintering the silicon carbide fiber in an atmosphere of an inert gas at a temperature of 1400 to 2100 deg. C. and at a pressure of 300 to 3000 kg/cm².

According to another embodiment of the present invention there is provided a method of manufacturing a sintered body of silicon carbide which is characterized by the steps of: melting into a fiber an organosilicon high molecular compound having a main skeleton of silicon and carbon or a compound obtained by polymerization of an organometallic compound and the organosilicon high molecular compound; antimelt-treating the fiber in an atmosphere of an oxidizing gas and thereafter heating the antimelt-treated fiber in an atmosphere of a mixture of an inert gas and a hydrocarbon gas to obtain a fiber of silicon carbide containing 2 to 20% by weight of oxygen and having on the surface thereof a thin layer (or film) of amorphous carbon; mixing a silicon powder with the fiber; and sintering the fiber in an atmosphere of an inert gas at a temperature of 1400 to 2100 deg. C. and at a pressure of 300 to 3000 kg/cm².

DETAILED DESCRIPTION

As the organosilicon high molecular compound having a main skeleton of silicon and carbon, polycarbosilane, polydimethylsilane, polymethylphenylsilane, and the like having an average molecular weight of 1000-3000 and having the following molecular formulas polycarbosilane: 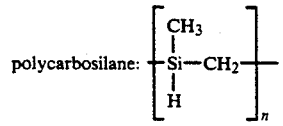

polydimethylsilane: 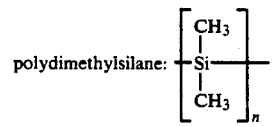

polymethylphenylsilane: 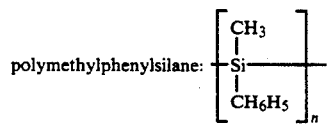

can be used.

As a compound obtained by polymerization of an organometallic compound and the organosilicon high molecular compound, polytitanocarbosilane of the formula

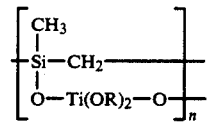

which is obtained by polymerization of polycarbosilane and alkoxytitan (organometallic compound), polyzirconocarbosilane of the formula

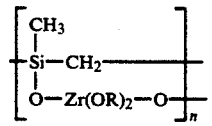

which is obtained by polymerization of polycarbosilane and alkoxylzircon (organometallic compound), and the like can be used.

According to the first step of the present invention the organosilicon high molecular compound or compound obtained by polymerization of an organometallic compound and the organosilicon high molecular compound is melted into a fiber. As used herein the term fiber is intended to mean single filaments or a plurality of filaments, sometimes referred to herein as a yarn, which can be spun or twisted. The fibers of silicon carbide are normally used by constituting them into an aggregative yarn (or tow) of 200 to 6000 filaments/yarn (or tow).

The temperature at which the antimelt-treatment is performed in an atmosphere of an oxidizing gas after the above-mentioned organosilicon high molecular compound or the compound obtained by polymerization of the organometallic compound and the organosilicon high molecular compound is melted into a fiber is generally about 130 to 200 deg. C. The time for the treatment is generally about 5 minutes to 10 hours, and air or oxygen gas can be used as the oxidizing gas.

The temperature at which the heat treatment is performed in an atmosphere of an inert gas subsequent to the above-mentioned antimelt-treatment, is generally about 900 to 1500 deg. C., and the time therefor is generally 10 to 40 hours. As the inert gas, argon gas, nitrogen gas or the like is used. By the above-mentioned treatments, fibers of silicon carbide whose filament diameters are 3 to 200 $\mu$m are obtained, the fibers being composed of 40 to 70% by weight of silicon, 20 to 40% by weight of carbon and 2 to 20% by weight of oxygen and being mainly constituted by amorphous fine particles.

The temperature at which the heat treatment is performed in an atmosphere of a mixture of an inert gas and a hydrocarbon gas subsequent to the above-mentioned antimelt-treatment, is generally about 1000 to 1200 deg. C. and the time therefor is generally 10 to 40 hours. As the gas mixture, such a gas is used as is obtained by mixing about 0.1 to 10% by volume of a hydrocarbon gas such as methane gas, ethane gas, propane gas, and the like with an inert gas such as argon gas, nitrogen gas, and the like. By the above-mentioned treatments, fibers of silicon carbide whose filament diameters are 3 to 200 $\mu$m are obtained, the fibers being composed of 40 to 70% by weight of silicon, 20 to 40% by weight of carbon and 2 to 20% by weight of oxygen and being mainly constituted by amorphous fine particles and having a thin coating layer (film) of amorphous carbon on the surfaces thereof.

The fibers of silicon carbide which are obtained through each of the above-mentioned treatments and which contain a limited oxygen content, can be sintered without adding a binder or an agent. The reason why the oxygen content of the fibers of the silicon carbide is maintained within 2 to 20% by weight is that when the oxygen content of the fibers of silicon carbide is below 2% by weight, bonding becomes impossible in the heating and sintering under pressure in the atmosphere of inert gas; and when the oxygen content in the fibers of silicon carbide is above 20% by weight, too many voids occur in the heating and sintering under pressure in the atmosphere of an inert gas, thereby causing a decrease in the strength of the sintered body of silicon carbide.

The reason why the temperature at which the heating of the fibers of silicon carbide containing 2 to 20% by weight of oxygen in the atmosphere of an inert gas is maintained within 1400 to 2100 deg. C., and the reason why the sintering thereof is performed at a pressure of 300 to 3000 kg/cm$^2$ are that when the temperature and the pressure are lower than these ranges, sufficient strengths of the fibers cannot be obtained; and when the temperature and the pressure exceed these ranges, the particles of silicon carbide become too coarse, resulting in a decrease in strength. The time of heating the fibers of silicon carbide under pressure in the atmosphere of the inert gas should be about 30 to 300 minutes. As the inert gas, argon gas, helium gas, or the like is used.

As the silicon powder to be mixed with the fibers of silicon carbide which are heat-treated in the atmosphere of the mixed gas and have a coating layer (or film) of amorphous carbon thereon, a powder of average particle size of about 0.3 to 50 $\mu$m is used. The amount of addition of the silicon powder is generally about 0.1 to 20% by weight, based on the weight of the silicon carbide fibers.

By heating and sintering the fibers of silicon carbide containing 2 to 20% by weight of oxygen, in an atmosphere of an inert gas under pressure, a sintered body of silicon carbide is formed.

By adding silicon powder to the fibers of silicon carbide containing 2 to 20% by weight of oxygen and having a layer (or film) of amorphous carbon on the surfaces thereof, and then heating and sintering them under pressure in an atmosphere of an inert gas, the amorphous carbon and silica appear to react together to form a sintered body of silicon carbide.

Embodiment examples of the method of this invention are explained hereinbelow together with comparative examples.

EMBODIMENT EXAMPLE 1

Polycarbosilane (having an average molecular weight of 2200 and a melting point of 240 deg. C.) was melted and spun into a yarn, and then heated at 160 deg. C. for 10 minutes in atmospheric air to perform an antimelt-treatment. Then the spun yarn was further heated at 1000 deg. C. for 8 hours in an atmosphere of nitrogen gas to obtain a yarn of fibers of silicon carbide in which the diameter of individual fibers (filament diameter) was 12 $\mu$m and which consisted of 500 filaments/yarn. An aggregate of fibers obtained by parallelly arranging together 2000 yarns of the fibers of silicon carbide as prepared above was set in a graphite mold and was heated at a temperature of 2000 deg. C. at a pressure of 1000 kg/cm$^2$ for 180 minutes in an atmosphere of argon gas to obtain a sintered body of silicon carbide in plate form of 60 mm $\times$ 80 mm in size and 2 mm in thickness.

The oxygen content of the fibers of silicon carbide prepared according to the above-mentioned method as well as the bending strength of the sintered body of the silicon carbide at room temperature and at high temperature were measured. The results are given in Table 1.

The oxygen content of the fibers of silicon carbide was measured by a fully automatic oxygen and nitrogen analyzing apparatus (made by Horiba Seisakusho). The bending strength at room temperature (25 deg. C.) of the sintered body of silicon carbide was measured by an Instron type testing machine, and its bending strength at high temperature was measured by the Instron type testing machine by heating the sintered body of silicon carbide to a temperature of 1600 deg. C. in an atmosphere of argon gas.

EMBODIMENT EXAMPLE 2

A sintered body of silicon carbide in the form of a plate of 60 mm $\times$ 80 mm in size and 2 mm in thickness was prepared using the same method as in EMBODIMENT EXAMPLE 1 except that the temperature of the antimelt-treatment was 170 deg. C., and its duration was 20 minutes.

The oxygen content of the fibers of silicon carbide and the bending strength of the sintered body of silicon carbide at room temperature as well as at high temperature were measured by the same means as in EMBODIMENT EXAMPLE 1. The results are given in Table 1.

EMBODIMENT EXAMPLE 3

A sintered body of silicon carbide in the form of a plate of 60 mm × 80 mm in size and 2 mm in thickness was prepared using the same method as in EMBODIMENT EXAMPLE 1 except that the temperature of the antimelt-treatment was 180 deg. C., and its duration was 25 minutes.

The oxygen content of the fibers of silicon carbide and the bending strength of the sintered body of silicon carbide at room temperature as well as at high temperature were measured by the same means as in EMBODIMENT EXAMPLE 1. The results are given in Table 1.

EMBODIMENT EXAMPLE 4

A sintered body of silicon carbide in the form of a plate of 60 mm × 80 mm in size and 2 mm in thickness was prepared using the same method as in EMBODIMENT EXAMPLE 1 except that the temperature of the antimelt-treatment was 200 deg. C., and its duration was 40 minutes.

The oxygen content of the fibers of silicon carbide and the bending strength of the sintered body of silicon carbide at room temperature as well as at high temperature were measured by the same means as in EMBODIMENT EXAMPLE 1. The results are given in Table 1.

COMPARATIVE EXAMPLE 1

A sintered body of silicon carbide in the form of a plate of 60 mm × 80 mm in size and 2 mm in thickness was prepared using the same method as in EMBODIMENT EXAMPLE 1 except that the temperature of the antimelt-treatment was 150 deg. C. and its duration was 10 minutes.

The oxygen content of the fibers of silicon carbide and the bending strength of the sintered body of silicon carbide at room temperature as well as at high temperature were measured by the same means as in EMBODIMENT EXAMPLE 1. The results are given in Table 1.

COMPARATIVE EXAMPLE 2

A sintered body of silicon carbide in the form of a plate of 60 mm × 80 mm in size and 2 mm in thickness was prepared using the same method as in EMBODIMENT EXAMPLE 1 except that the temperature of the antimelt-treatment was 210 deg. C., and its duration was 50 minutes.

The oxygen content of the fibers of silicon carbide and the bending strengths of the sintered body of silicon carbide at room temperature as well as at high temperature were measured by the same method as in EMBODIMENT EXAMPLE 1. The results are given in Table 1.

TABLE 1

| | Oxygen content (% by wt) | Bending strength, room temp. (kg/mm$^2$) | Bending strength, 1600° C. (kg/mm$^2$) |
| --- | --- | --- | --- |
| EMBODIMENT EXAMPLE 1 | 2 | 60 | 32 |
| EMBODIMENT EXAMPLE 2 | 8 | 80 | 68 |
| EMBODIMENT EXAMPLE 3 | 12 | 82 | 70 |
| EMBODIMENT EXAMPLE 4 | 20 | 66 | 35 |
| COMPARATIVE EXAMPLE 1 | 1.7 | (not measurable) | |
| COMPARATIVE EXAMPLE 2 | 22 | 45 | 8 |

As can be seen from the data of Table 1, it has been found that the sintered bodies of silicon carbide prepared by the methods of EMBODIMENT EXAMPLES 1, 2, 3 and 4 in which the oxygen content of the fibers of silicon carbide was within the range according to this invention, had excellent bending strengths. On the contrary, the sintered bodies of silicon carbide prepared by the methods of COMPARATIVE EXAMPLES 1 and 2 in which the oxygen content of the fibers of silicon carbide was outside the range according to the present invention, had lower bending strengths. Especially, the bonding of the fibers was insufficient in the sintered body of silicon carbide in COMPARATIVE EXAMPLE 1 in which the oxygen content of the fibers of silicon carbide was 1.7% by weight, so that the bending strength could not be measured. As a consequence, it has been confirmed that, by maintaining the oxygen content of the fibers of silicon carbide within the range of 2 to 20% by weight, a sintered body of silicon carbide having an excellent bending strength can be obtained.

EMBODIMENT EXAMPLE 5

Polycarbosilane (having an average molecular weight of 2200 and a melting point of 240 deg. C.) was melted and spun into a yarn, and then heated at 170 deg. C. for 60 minutes in atmospheric air to perform an antimelt-treatment. Then it was further heated at 1000 deg. C. for 8 hours in an atmosphere of nitrogen gas, and a yarn of fibers of silicon carbide in which the diameter of individual fibers (filament diameter) was 12 μm and which consisted of 500 filaments/yarn containing 10% by weight of oxygen was prepared. An aggregate of fibers obtained by parallelly arranging together 2000 yarns of the fibers of silicon carbide as prepared above was set in a graphite mold and was heated at a temperature of 2000 deg. C. at a pressure of 1000 kg/cm$^2$ for 180 minutes in an atmosphere of argon gas to obtain a sintered body of silicon carbide in plate form of 60 mm × 80 mm in size and 2 mm in thickness.

The density and the bending strength at room temperature and at high temperature of the sintered body of the silicon carbide which was prepared by the abovementioned method were measured. The results are given in Table 2.

The density was measured by means of a pycnometer. The bending strengths at room temperature and at high temperature were measured in accordance with the measuring method used in EMBODIMENT EXAMPLE 1.

EMBODIMENT EXAMPLE 6

As a mold, a cylindrical core of graphite having an external diameter of 500 mm and a length of 1000 mm, and an external form of silica glass having an internal diameter of 504 mm and a length of 1000 mm were used. A sintered body of silicon carbide in a cylindrical form of 500 mm in internal diameter, 1000 mm in length and 2 mm in thickness was prepared according to the same method as used in EMBODIMENT EXAMPLE 5 except that the treating conditions in the mold were changed to a temperature of 1900 deg. C. and a pressure of 2000 kg/cm² and a processing time of 120 minutes.

The density and the bending strength at room temperature and at high temperature of the sintered body of silicon carbide thus obtained were measured by the same means as in EMBODIMENT EXAMPLE 5. The results are given in Table 2.

EMBODIMENT EXAMPLE 7

A sintered body of silicon carbide in plate form of 60 mm × 80 mm in size and 2 mm in thickness was prepared using the same method as EMBODIMENT EXAMPLE 5 except that polytitanocarbosilane (having an average molecular weight of 2000 and a melting point of 180 deg. C.) was used in place of polycarbosilane.

The oxygen content in the fibers of silicon carbide was 18% by weight.

The density and the bending strength at room temperature and at high temperature of the sintered body of silicon carbide thus obtained were measured by the same means as in EMBODIMENT EXAMPLE 5. The results are given in Table 2.

EMBODIMENT EXAMPLE 8

Polycarbosilane (having an average molecular weight of 2200 and a melting point of 240 deg. C.) was melted and spun into a yarn, and then heated at 180 deg. C. for 90 minutes in atmospheric air to perform an antimelt-treatment. Then the yarn was further heated at 1000 deg. C. for 8 hours in an atmosphere of nitrogen gas and was still further heated at 1200 deg. C. for 2 hours in an atmosphere of a mixture of 0.5% by volume of propane gas and 99.5% by volume of nitrogen gas. A yarn of fibers of silicon carbide in which the diameter of individual fibers (filament diameter) is 12 μm and which consisted of 500 filaments/yarn containing 10% by weight of oxygen was prepared, each of the fibers being coated on its surface with a thin layer (or film) of amorphous carbon. The obtained yarn of fibers of silicon carbide was chopped into lengths of 30 mm. A mixture obtained by adding 5 parts by weight of a silicon powder (having an average particle diameter of 0.3 micron meter) to 100 parts by weight of fibers of silicon carbide and mixing them together, was set into a mold of graphite and was then heated at 1800 deg. C. for 180 minutes at a pressure of 1500 kg/cm² to obtain a sintered body of plate form of 60 mm × 80 mm in size and 1.5 mm in thickness.

The density and the bending strength at a room temperature and at high temperature of the sintered body of silicon carbide thus obtained were measured by the same means as in EMBODIMENT EXAMPLE 5. The results are given in Table 2.

EMBODIMENT EXAMPLE 9

A sintered body of silicon carbide in plate form of 60 mm × 80 mm in size and 2 mm in thickness was prepared using the same method as in EMBODIMENT EXAMPLE 8 except that polytitanocarbosilane (having an average molecular weight of 2000 and a melting point of 180 deg. C.) was used in place of polycarbosilane.

The oxygen content in the fibers of the silicon carbide was 20% by weight.

The density and the bending strength at room temperature and at high temperature of the sintered body of silicon carbide thus obtained were measured by the same means as in EMBODIMENT EXAMPLE 5. The results are given in Table 2.

COMPARATIVE EXAMPLE 3

A sintered body of silicon carbide of plate form of 60 mm × 80 mm in size and 2 mm in thickness was prepared using the same method as EMBODIMENT EXAMPLE 5 except that the sintering temperature and the pressure were changed to 1300 deg. C. and 250 kg/cm², respectively.

The density and the bending strength at room temperature and at high temperature of the sintered body of silicon carbide thus obtained were measured by the same means as in EMBODIMENT EXAMPLE 5. The results are given in Table 2.

COMPARATIVE EXAMPLE 4

About 2000 yarns of the same fibers of silicon carbide as were used in EMBODIMENT EXAMPLE 1 were parallelly arranged, and 30% by weight of polycarbosilane was added thereto as a binder. They were then set in a mold of graphite and heated in an atmosphere of argon gas at 1800 deg. C. and 1200 kg/cm² for 180 minutes to obtain a sintered body of silicon carbide of plate form of 60 mm × 80 mm in size and 2 mm in thickness.

The density and the bending strength at room temperature and at high temperature of the sintered body of silicon carbide thus obtained were measured by the same means as in EMBODIMENT EXAMPLE 5. The results are given in Table 2.

COMPARATIVE EXAMPLE 5

The density and the bending strength at room temperature and at high temperature of a sintered body of silicon carbide commercially available on the market in which B₄C was used as a sintering agent, were measured by the same means as in EMBODIMENT EXAMPLE 5. The results are given in Table 2.

TABLE 2

| | Density (g/cm³) | Bending strength, room temp. (kg/mm²) | Bending strength, 1600° C. (kg/mm²) |
|---|---|---|---|
| EMBODIMENT EXAMPLE 5 | 3.1 | 80 | 70 |
| EMBODIMENT EXAMPLE 6 | 3.1 | 73 | 61 |
| EMBODIMENT EXAMPLE 7 | 3.1 | 67 | 35 |
| EMBODIMENT EXAMPLE 8 | 3.1 | 80 | 74 |
| EMBODIMENT EXAMPLE 9 | 3.1 | 70 | 61 |
| COMPARATIVE EXAMPLE 3 | 2.9 | 38 | 12 |
| COMPARATIVE EXAMPLE 4 | 2.9 | 40 | 16 |
| COMPARATIVE EXAMPLE 5 | 3.1 | 55 | 20 |

As can be seen from the data of Table 2, the sintered bodies of silicon carbide prepared according to the methods of EMBODIMENT EXAMPLES 5, 6, 7, 8 and 9 of this invention were found to have superior bending strengths. On the contrary, the sintered body of silicon carbide which was prepared according to the method of COMPARATIVE EXAMPLE 3 and in which the temperature and the pressure during the final heating step in the atmosphere of the inert gas were outside the ranges according to this invention, and the sintered body of silicon carbide prepared in the COMPARATIVE EXAMPLE 4 by the conventional method had both lower bending strengths as well as lower densities. The sintered body of silicon carbide of COMPARATIVE EXAMPLE 5 which is commercially available on the market was found to have a lower bending strength, and particularly, a remarkably lower bending strength at high temperature, although it has a density equivalent to that of the sintered body of silicon carbide which was prepared according to the method of this invention.

What is claimed is:

1. A method of manufacturing a sintered body of silicon carbide consisting essentially of the steps of:

heating on organosilicon high molecular compound having a main skeleton of silicon and carbon, or a mixture of said compound with a compound obtained by the polymerization of an organometallic compound, to obtain a melt, forming a yarn comprising a bundle of fibers from the melt, heating the bundle of fibers at 130°-200° C. in an atmosphere of an oxidizing gas to anti-melt treat the fibers, heating the bundle of anti-melt-treated fibers at 900°-1500° C. in a mixture of an inert gas and a hydrocarbon gas to obtain a bundle of silicon carbide fibers, and fibers containing 2 to 20% by weight of oxygen, and having on the surface thereof a thin layer of amorphous carbon, mixing said bundle of silicon carbide fibers with a silicon powder, and heating the bundle of silicon carbide fibers mixed with the silicon powder in an atmosphere of an inert gas at a temperature of 1400° to 2100° C. and at a pressure of 300 to 3000 $kg/cm^2$ to react the amorphous carbon on the silicon carbide fibers with the silicon powder and form the sintered body of silicon carbide.

2. The method according to claim 1 wherein the step of heating of the antimelt-treated fiber is carried out at a temperature of 1000°-1200° C. for a time of from 10 to 40 hours.

* * * * *